US 8,966,314 B2

(12) United States Patent
Vecera et al.

(10) Patent No.: US 8,966,314 B2
(45) Date of Patent: Feb. 24, 2015

(54) DECLARATIVE TEST RESULT VALIDATION

(75) Inventors: Martin Vecera, Brno (CZ); Jiri Pechanec, Mokra-Horakov (CZ)

(73) Assignee: Red Hat, Inc., Raleigh, NC (US)

( * ) Notice: Subject to any disclaimer, the term of this patent is extended or adjusted under 35 U.S.C. 154(b) by 236 days.

(21) Appl. No.: 12/551,441

(22) Filed: Aug. 31, 2009

(65) Prior Publication Data

US 2011/0055635 A1    Mar. 3, 2011

(51) Int. Cl.
*G06F 11/00* (2006.01)
*G06F 11/36* (2006.01)

(52) U.S. Cl.
CPC .................................. *G06F 11/3692* (2013.01)
USPC ........................................................... 714/32

(58) Field of Classification Search
USPC ........................................................... 714/32
See application file for complete search history.

(56) References Cited

U.S. PATENT DOCUMENTS

| | | | |
|---|---|---|---|
| 6,002,868 A | 12/1999 | Jenkins et al. | |
| 6,286,035 B1 | 9/2001 | Gillis et al. | |
| 6,463,552 B1 | 10/2002 | Jibbe | |
| 6,697,967 B1 | 2/2004 | Robertson | |
| 7,464,297 B2 | 12/2008 | Potter et al. | |
| 7,493,521 B1 * | 2/2009 | Li et al. ....................... | 714/38.13 |
| 2004/0199818 A1 | 10/2004 | Bollen et al. | |
| 2007/0038890 A1 * | 2/2007 | El Far et al. .................... | 714/25 |
| 2008/0010553 A1 | 1/2008 | Betawar et al. | |
| 2008/0130682 A1 | 6/2008 | Akadiri | |
| 2008/0144529 A1 | 6/2008 | McKee | |
| 2008/0216053 A1 * | 9/2008 | Sluiman et al. ................ | 717/124 |
| 2009/0063999 A1 * | 3/2009 | Gaug et al. ..................... | 715/760 |
| 2009/0307763 A1 | 12/2009 | Rawlins et al. | |
| 2010/0057405 A1 * | 3/2010 | Wu .............................. | 702/187 |
| 2010/0100872 A1 * | 4/2010 | Mitra ............................ | 717/125 |
| 2011/0055633 A1 | 3/2011 | Vecera | |

OTHER PUBLICATIONS

JBoss Enterprise SOA Platform, www.redhat.com/jboss, 2007, 5 pgs.
JBoss ESB 4.4 GA, Getting Started With Jboss ESB, JBESB-GS—Aug. 5, 2008, 13 pgs.
JBoss ESB, What is an ESB?, http://www.jboss.org/jbossesb/resources/WhatIsAnESB.html, Dec. 16, 2008, 2 pgs.
JBoss ESB 4,4 GA, Services Guide, JBESB-GS—Aug. 5, 2008, 73 pgs.
"Apache Ant Demystified—Parts 1 and 2", Server-side Coding, Java and J2EE, www.sitepoint.com/print/apache-ant-demystified, Aug. 31, 2009, 11 pgs.
U.S. Appl. No. 12/551,461, Non-Final Office Action dated Dec. 23, 2010.
U.S. Appl. No. 12/551,461, Final Office Action dated Jun. 8, 2011.
U.S. Appl. No. 12/551,461, Non-Final Office Action dated Aug. 12, 2011.

(Continued)

*Primary Examiner* — Scott Baderman
*Assistant Examiner* — Jigar Patel
(74) *Attorney, Agent, or Firm* — Lowenstein Sandler LLP

(57) ABSTRACT

A test controller translates test rules into executable code and validates the test results using the executable code. The test controller translates the test rules using a test grammar. The test rules are used to indicate expected test results of a device under test. The test controller further generates the test results by executing test instructions. In addition, the test controller uses the test grammar to validate the test rules.

20 Claims, 6 Drawing Sheets

(56) References Cited

OTHER PUBLICATIONS

U.S. Appl. No. 12/551,461, Non-Final Office Action dated Sep. 21, 2011.
U.S. Appl. No. 12/551,461 Non-Final Office Action dated Mar. 6, 2012.
U.S. Appl. No. 12/551,461 Final Office Action dated Oct. 9, 2012.
U.S. Appl. No. 12/551,461 Non-Final Office Action dated Apr. 23, 2013.

* cited by examiner

```
(202A) There are 9 messages.
(202B) There are none messages with property
"org.jboss.soa.esb.message.byte.size" that equals "50210".
(202C) There are at least 3 messages with body that starts with
"Hello".
(202D) Between messages 2 and 6 there are at least 2 messages
with body that starts with "Hello".
(202E) There are at most 5 messages with body that ends with
"Hello".
(202F) There are exactly 3 messages with property
"org.jboss.soa.esb.message.source" that contains
"PortReference".
(202G) Message 3 body starts with "Hello".
(202H) Message 2 body ends with "World".
(202I) Messages 5 to 8 property
"org.jboss.soa.esb.message.byte.size" equals "5021".
(202J) Message 8 property "org.jboss.soa.esb.message.source"
contains "PortReference".
(202K) Message 4 property "org.jboss.soa.esb.message.source"
contains "queue/quickstart_helloworld_Request_esb".
(202L) Message 7 header to contains "queue/
quickstart_helloworld_esb".
(202M) Message 2 and 7 IDs are equal.
```

200

FIG. 2

DECLARATIVE TEST RESULT VALIDATION

TECHNICAL FIELD

Embodiments of the present invention relate to a method and system for validating test results. Specifically, embodiments of the invention relate to using a test grammar to define test rules that are used to validate test results.

BACKGROUND

Software tests are used to validate software, hardware, or a combination of software and hardware. To evaluate the results of a software test, a quality engineer (QE) manually evaluates a test output to determine a test result, which can be a laborious for large amount test results. Alternatively, the tests can be automatically validated using test validation code, which interprets and determines that test result. Although having test validation code may be more effective than manually evaluating the test results, this requires a QE to write and maintain the test validation code. This can be a difficult task, especially when there is a large amount of reported states from the software and/or hardware being tested.

BRIEF DESCRIPTION OF THE DRAWINGS

FIG. 2 is an exemplary embodiment of test rules defined in a test grammar.

DETAILED DESCRIPTION

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

A test controller translates test rules into executable code, where the executable code is subsequently used validate test results is described. The test controller generates the test results using test instructions. In one embodiment, the test controller translates the test rules into executable code using a test grammar. In addition, the test controller validates the test rules using the test grammar. Furthermore, the test grammar is specific to a particular domain of device types. This test grammar allows the QE to specify the test rules in a declarative language instead of manually developing the software code used for the test result validation.

In another embodiment, the test rules specify the expected results of a test in a declarative form of the test grammar. For example, and in one embodiment, the test rules can specify the number of messages that should result from a test, message content, property characteristics, etc.

Figure 1:
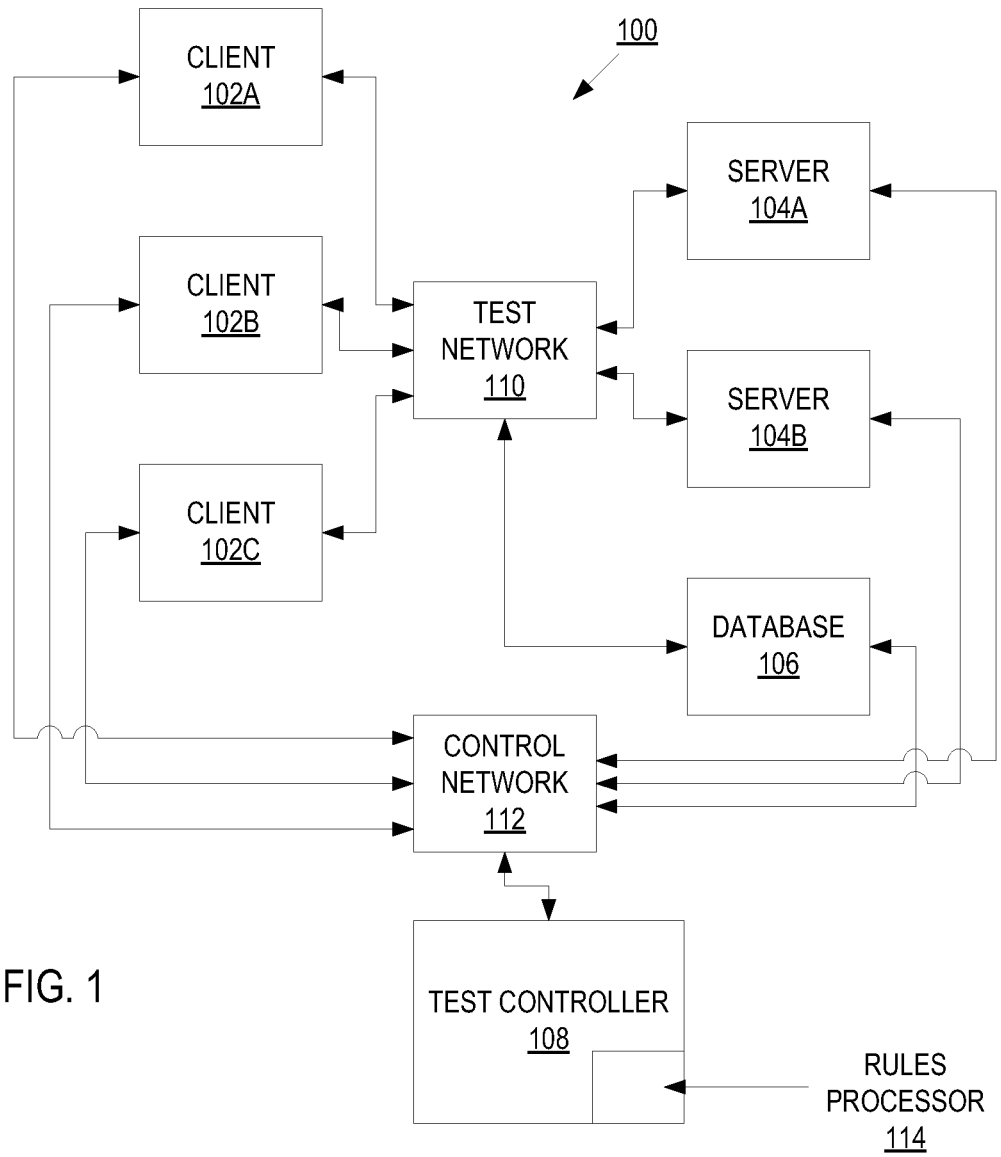
FIG. 1 is a block diagram of one embodiment of a testing system that includes a test controller.

FIG. 1 is a block diagram of one embodiment of a testing system 100 that includes a test controller 106. Testing system 100 includes a test network 110 that couples testing clients 102A-C, servers 104A-B, and database 108. In one embodiment, test network 110 allows data communications between the devices coupled to this network. For example and in one embodiment, the test network is a testbed for testing servers 104A-B and/or database 108. Testing clients 102A-C can be one of a personal computer, laptop, cell phone, smartphone, settop box, personal digital assistant, music player, or another type of device that can interact with servers 104A-B. In one embodiment, testing clients 102A-C are used to test servers 104A-B. Any type of test known in the art can be run using testing clients: validation tests, stress tests, performance tests, saturation tests, integration tests, etc. Servers 104A-B are servers known in the art, such as a web server, a file server, mail server, application server, enterprise server bus (ESB) servers, etc. and are the devices that are subject to the tests by testing clients 102A-C. In one embodiment, servers 104A-B are MOSS Enterprise™ ESB servers from JBOSS™, a division of RED HAT™, Incorporated of Raleigh, N.C. While in this embodiment, three testing clients and two testing servers are illustrated, in alternate embodiments, the same, more, or less numbers of testing clients and/or servers can be used. Database 108 stores data used in the tests, such as input data, configurations, test results, etc.

Furthermore, testing system 100 includes a control network 112 that is used to couple test controller 106 with clients 102A-C, servers 102A-B, and database 108. In one embodiment, test controller 106 controls the execution of the tests. In this embodiment, a test can compose of one or more of: configuring the devices used in the tests; sending the test instructions to the test devices; executing the tests; collecting the test results; and validating the test results. As mentioned above, validating the tests can be evaluated by a QE or automatically validated using specialized software code for each of the completed tests. In one embodiment, instead of the QE writing specialized software code to validate the tests, the QE specifies a set of test rules that will be used to validate the test results. In one embodiment, these rules are declarative statements defined using a grammar, where the declarative statements are used to specify what the results of the tests should be. For example and in one embodiment, the test rules can specify the number of messages that should result from a test, message content, property characteristics, etc. Each of these rules is translated into software code that is executed to validate the tests after completion of the tests. In one embodiment, a rules processor 114 processed these test rules into software code that can be used to validate the tests. For example and in one embodiment, rules processor 114 translates the test rules into JAVA bytecode that can be executed to validate the test results. Alternatively, rules processor 114 can translate the test rules into another type of software code known in the art that can be executed: PERL, C, C++, PYTHON, scripting languages (TCL, C Shell, etc.), etc. In one embodiment, test controller 106 executes the generated software code that is used to validate the test results. Executing the software code is done in a manner appropriate for the corresponding software code.

In one embodiment, the test rules are defined using a grammar that is specific for the system being tested. This grammar allows the QE to specify the test rules in a declarative language instead of manually developing the software code used for the test result validation. Rules processor 114 interprets the test rules using the grammar and translates the test rules into executable code that is used to validate the test results. For example, and in one embodiment, after the test is finished and a file with the list of states (messages in our case) is created, this list is loaded into memory of the test controller 106 and the rules that were defined for the particular test are executed using the Drools facility. In one embodiment, Drools is a business rule management system that can be used within a business rule engine and enterprise framework for the construction, maintenance, and enforcement of business policies in an organization, application, or service. As another example and in another embodiment, the test rules can specify the number of messages that should result from a test, message content, property characteristics, etc., as described below in FIG. 2.

In one embodiment, a different grammar is used for different types of devices or systems being tested. For example, and in one embodiment, there is a different grammar for testing a web server, ftp server, ESB server, etc. Each different grammar has a domain of device(s) that can be used with that grammar. In other words, the grammar is specific to the devices in the domain. In this embodiment, each grammar has a domain specific language (DSL). In one embodiment, this language includes language definitions that are used to validate the test rules. For example and in one embodiment, the following language definitions that can be used for validating test rules for an ESB server are:

```
(1) [condition][ ]There are {count} messages.=1:List (size ==
{count})
(2) [condition][ ]Message {number1} and {number2} IDs are
equal.=1:List(eval(ValidatorUtil.validateMessageIdEquals(1,
{number1} – 1, {number2} – 1)))
(3) [condition][ ]Message {number} header reply to equals
"{str}".=1:List (eval(ValidatorUtil.validateMessage(1, {number} –
1, MessagePart.HEADER_REPLY_TO, null, Operator.EQUALS,
"{str}")))
```

In this example, language definition (1) is used to specify the grammar for a test rule to specify the number of messages that should be in the test results. Language definition (2) is used to specify the grammar for a test rule that specifies that two different messages have the same identification. Language definition (3) is used to specify the grammar for a test rule that the message header "reply to" equals a specific string.

This language definition includes specific indications on how to translate the test rules into executed code for the devices to be tested in that domain. For example, and in one embodiment, the test rule:
file "test.jpg" is present
In embodiment, for a file server, the translated executed code will look for that file on the local hard drive. In another embodiment, for an hypertext transfer protocol (HTTP) or file transfer protocol (FTP) server, the translated executed code will execute an HTTP or FTP command.

In addition, the grammar can be specified in a format as known in the art: eXtended Markup Language (XML), hypertext markup language, plain test, binary, in a database, etc. FIG. 2 is an exemplary embodiment of test result rules 200 using a grammar. In FIG. 2, test rules 200 is composed of individual test rules 202A-M that are used to validate executed tests. Test rules 202A-M can specify the number of messages that should result from a test, message content, property characteristics, etc. For example and in one embodiment, test rules 202A specifies that there are to be nine messages that result from the test. If there are more or less then an error results from this test. In this example, the rules processor translates test rule 202A into JAVA code that is used to check the number of message. For example, and in one embodiment, the JAVA code for a list of messages pushed to the working memory of a device running Drools is: "if (list.size( )==<count>) {markTheRuleAsVerified( );}."

In one embodiment, the test rules can lay out certain specifications for message properties. For example and in one embodiment, test rule 202B is an example of a rule that specifies that a message should not have particular content. In this example, there should be no messages with the property "org.jboss.soa.esb.message.byte.size" that have a size of 50210. This is translated into software code (2):
org.jboss.soa.esb.message.byte.size !=50210 (2).
In addition, test rule 202I specifies that the property "org.jboss.soa.esb.message.byte.size" of messages 5-8 should have a value equal to "5021."

In addition, the test rules can validate results based on partial string matching. For example and in one embodiment, the test rules can be constructed that specify how a message (or message component) should begin or end. Test rule 202C specifies that at least three of the messages of any property have a body that starts with the text "Hello." Test rule 202D specifies that between messages 2 and 6 there are at least two messages with a message body that starts with the string "Hello." Test rule 202E specifies that there are at most five messages with a body that end with the string "Hello." Furthermore, single messages can be specified to begin or end with a particular string. Test rule 202G specifies that the body of message 3 should start with "Hello", while test rule 202H specifies that the body of message 2 should end with the string "Hello."

In addition to specifying how a message property should begin or end, a test rule can also specify the general contents of a message. For example, and in one embodiment, test rule 202J specifies that the property "org.jboss.soa.esb.message.byte.source" of message 8 contains the string "PortReference." As another example, test rule 202K species that the "org.jboss.soa.esb.message.byte.source" of message 4 contains the string "queue/quickstart_helloworld_Request_esb." In addition, test rule 202L specifies that the header of message seven contain the string "queue/quickstart_helloworld_esb." As another example, test rule 202F specifies that there should be at least three messages that have the property org.jboss.soa.esb.message.byte.source" containing the string "PortReference."

In another embodiment, the test rules can make comparisons between messages. For example, and in one embodiment, test rule 202M specifies that the identification of messages two and seven should be equal.

Figure 3:
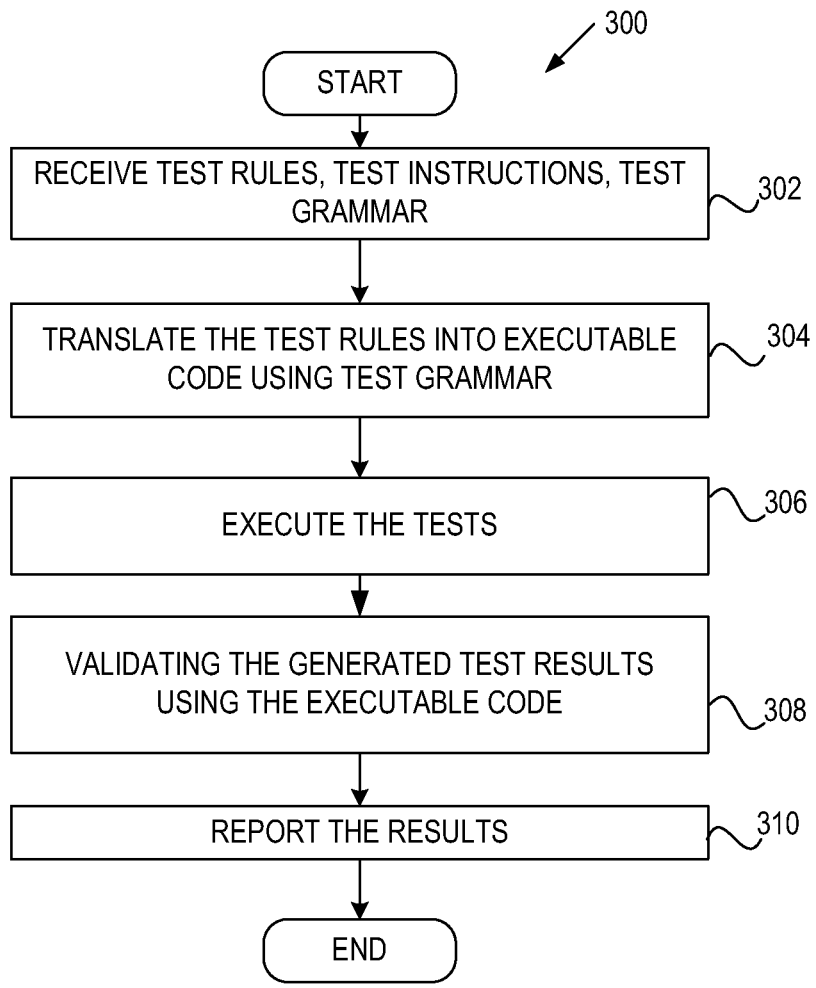
FIG. 3 is a flowchart of one embodiment of a process for validating test results using test rules.

FIG. 3 is a flowchart of one embodiment of a process 300 for validating test results using the test rules. The process may be performed by processing logic that may comprise hardware (e.g., circuitry, dedicated logic, programmable logic, microcode, etc.), software (e.g., instructions run on a processing device to perform hardware simulation), or a combination thereof. In one embodiment, the process 300 is performed by a test controller, such as test controller 108 of FIG. 1.

Referring to FIG. 3, process 300 begins with processing logic receiving the test rules, the test instructions, and the test rule grammar at block 302. In one embodiment, the test rules process 300 receives are test rules that are for the type of device being tested by process 300 as described in FIG. 1 above. For example and in one embodiment, the test rules can specify the number of messages that should result from a test, message content, property characteristics, etc., as described above in FIG. 2. In one embodiment, the test instructions are a set of instructions that are used to execute the tests in test system 100. In this embodiment, the test instructions can be used to initiate the tests on the testing clients, servers, and/or databases of the testing system. In another embodiment, the grammar is one (or more) of the domain specific grammar as specified in FIG. 1 above.

At block 304, process 300 translates the test rules into executable code using the test grammar. For example and in one embodiment, process 300 translates the test rules into JAVA bytecode, script language, object code, binary executable, etc. In this embodiment, process 300 parses the test rules based on the test grammar and outputs executable code to validate test results. In one embodiment, process 300 performs that translation as described in FIG. 4 below.

Process 300 executes the tests instructions to generate the test results at block 306. In one embodiment, process 300 executes the tests by executing code that controls the running of the tests as is known in the art. In one embodiment, process 300 translates a set of declarative test instructions into executable code that is used to run the test. Process 300 invokes the executable code to run the tests.

At block 308, process 300 evaluates the generated test results using the executable code. In one embodiment, process 300 invokes the executable code using a manner known in the art for executing code: invoking a binary executable, executing a JAVA bytecode, interpreting a script, etc. In one embodiment, the executable code retrieves the test results, compares the test results with the expected test results as indicated by the test rules, and generates the test results. In one embodiments, the test results could be as a simple as pass/fail or can be have more information, such as an exception report describing the error. Process 300 reports the results at block 310. Process 300 can report the results through a graphical user interface, save to a file, save to a database, report in an email, etc. and/or combinations thereof.

Figure 4:
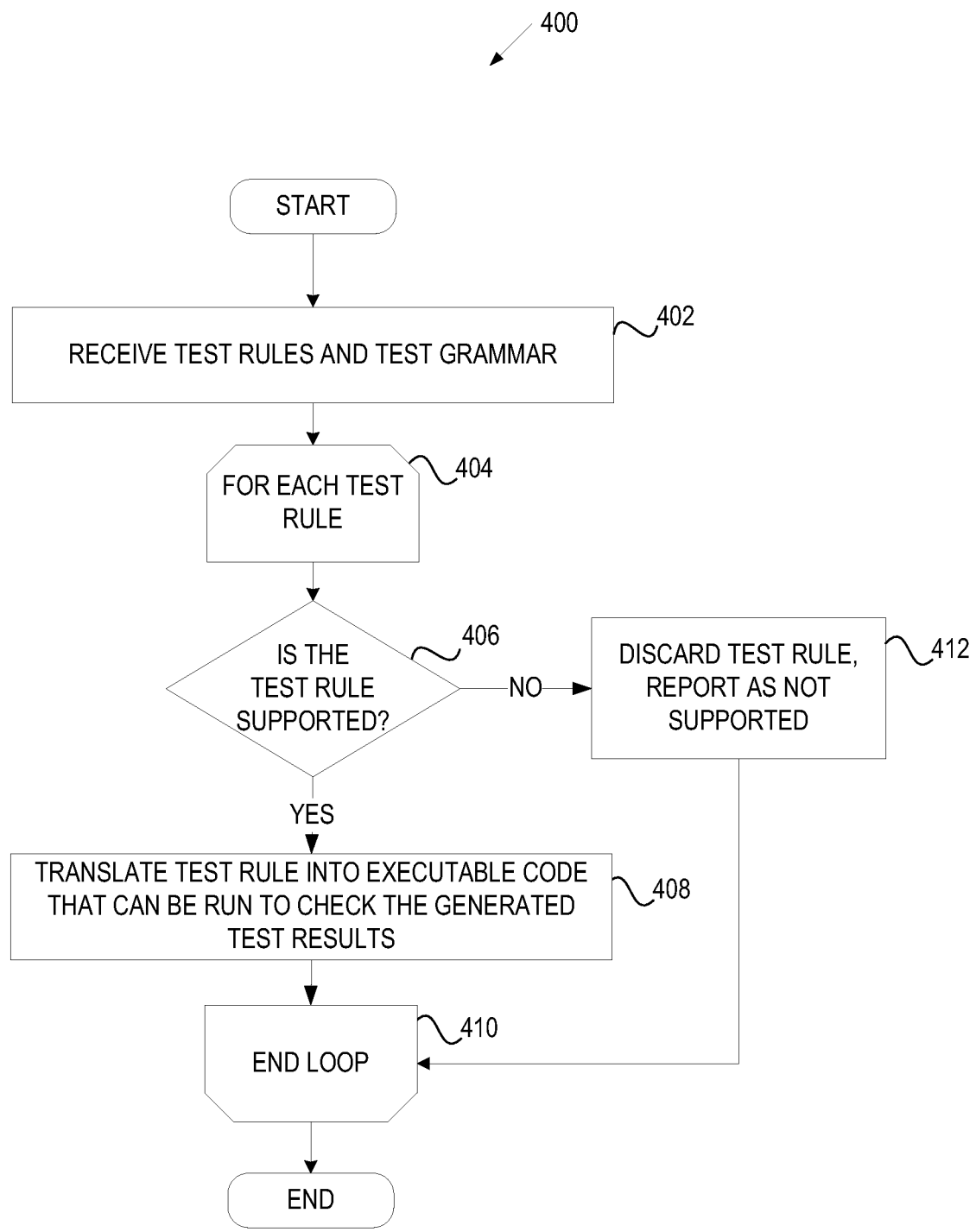
FIG. 4 is a flowchart of one embodiment of a process for translating test rules into executable code that can be used to validate the test results.

FIG. 4 is a flowchart of one embodiment of a process 400 for translating the test rules into code that can be used to validate the test results. The process may be performed by processing logic that may comprise hardware (e.g., circuitry, dedicated logic, programmable logic, microcode, etc.), software (e.g., instructions run on a processing device to perform hardware simulation), or a combination thereof. In one embodiment, the process 400 is performed by a rules processor, such as rules processor 114 of test controller 108 of FIG. 1.

Referring to FIG. 4, process 400 begins with processing logic receiving the test rules and the test grammar. In one embodiment, the test rules process 300 receives are test rules that are for the type of device being tested by process 300 as described in FIG. 1 above. For example, test rules can specify the number of messages that should result from a test, message content, property characteristics, etc., as described above in FIG. 2. In another embodiment, the grammar is a domain specific grammar as specified in FIG. 1 above. Furthermore, process 400 executes a processing loop (blocks 404-412) to translate each of the receive test rules. At block 406, process 400 determines if the test rule is supported based on the received test grammar. In one embodiment, process 400 parses the test rule using the test grammar and determines if the rule is supported. In one embodiment, process 400 used Drools with the Drools provided grammar. In an alternate embodiment, process 400 uses a source code compiler or interpreter to determine if the rule is supported. If the test rule is supported, process 400 translates the test rule into executable code that can be run to check the generated test results. For example, and in embodiment, process 400 uses Drools compiler to compile the rules into JAVA bytecode. If the rule is not supported, process 400 discards the test rule and reports that this test rule is supported by the grammar. In one embodiment, process 400 signals an error and stops the processing loop. In another embodiment, process 400 shows a warning and ignores the rule.

Figure 5A:
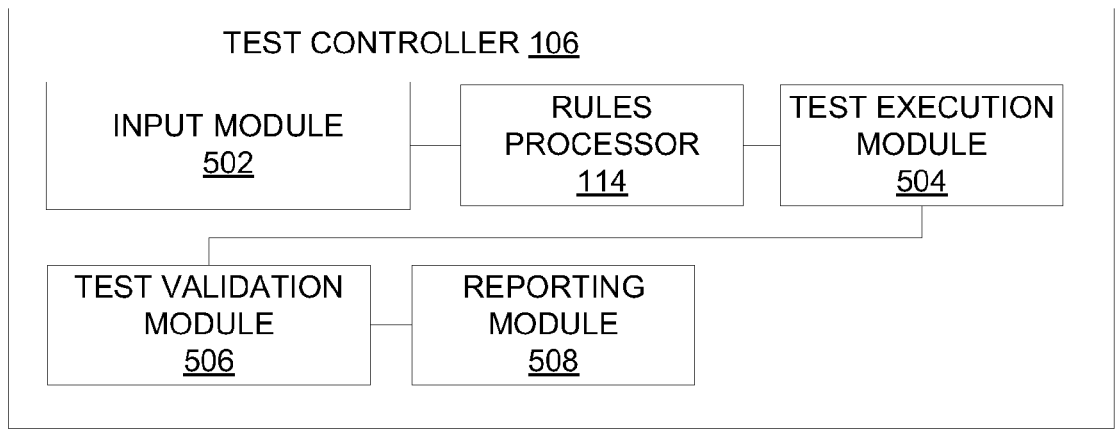
FIG. 5A is a block diagram of a test controller that validates test results using test rules.

FIG. 5A is a block diagram of a test controller 106 that is used to validate the test results using the test rules. In FIG. 5A, test controller 106 includes input module 502, rules processor 114, test execution module 504, test evaluation module 506, and reporting module 508. Input module 502 receives the test rules, test instructions, and test grammar as described in FIG. 3, block 302. Rules processor 114 translates the test rules into executable code using the test grammar as described in FIG. 3, block 304. Test execution module 504 executes the test instructions as described in FIG. 3, block 306. Test validation module 506 validates the test results as described in FIG. 3, block 308. Reporting module 508 reports the test results as described in FIG. 3, block 310.

Figure 5B:
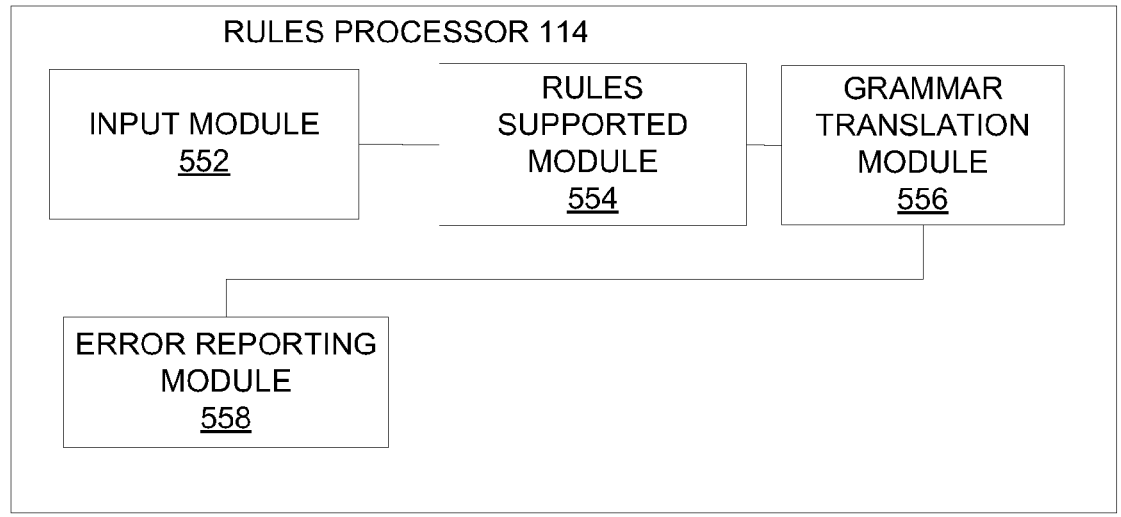
FIG. 5B is a block diagram of a rules processor that translates the test rules into executable code.

FIG. 5B is a block diagram of a rules processor 114 that is used to translate the test rules into executable code. In FIG. 5B, rules processor 114 includes input module 552, rules supported module 554, grammar translation module 556, and error reporting module 558. Input module 552 receives the test rules and test grammar as described in FIG. 4, block 402. Rules supported module 554 determines if an individual test rule is supported by the test grammar as described in FIG. 4, block 406. Grammar translation module 556 translates the test rule into executable code using the test grammar as described in FIG. 4, block 408. Error reporting module 558 reports errors in the test rule translation as described in FIG. 4, block 412.

Figure 6:
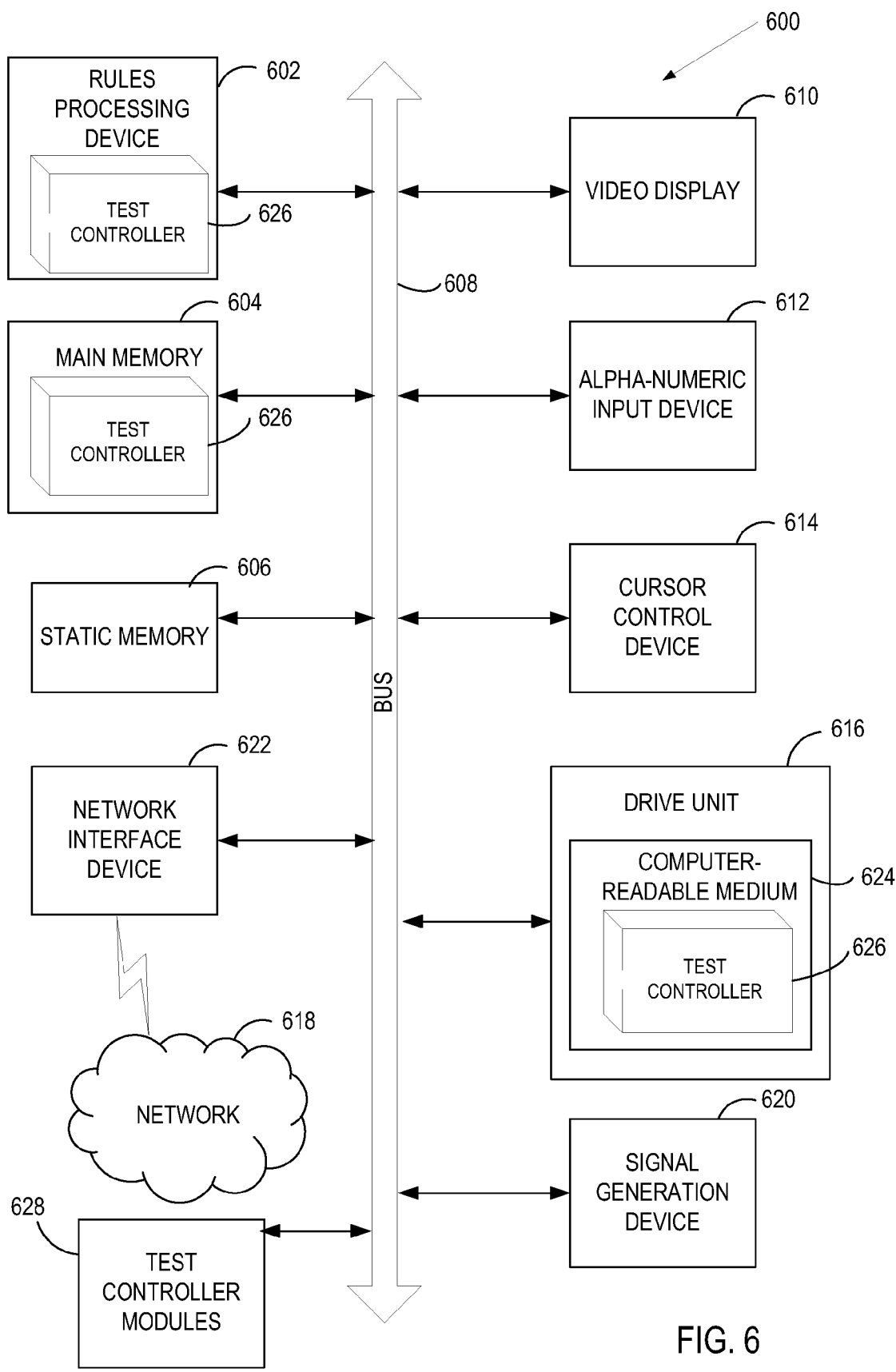
FIG. 6 is a diagram of one embodiment of a computer system for validating test results using test rules.

FIG. 6 is a diagram of one embodiment of a computer system for validating test results using test result rules. Within the computer system 600 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer processing test result rules and the server computer validating test results using test result rules) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or an machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a rules processing device 602, a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a secondary memory 616 (e.g., a data storage device in the form of a drive unit, which may include fixed or removable computer-readable storage medium), which communicate with each other via a bus 608.

Rules processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Rules processing device 602 may also be one or more special-purpose processing devices such as an application specific integrated circuit (ASIC), a field programmable gate array (FPGA), a digital signal processor (DSP), network processor, or the like. Rules processing device 602 is configured to execute the test controller 626 for performing the operations and steps discussed herein.

The computer system 600 may further include a network interface device 622. The computer system 600 also may include a video display unit 610 (e.g., a liquid crystal display (LCD) or a cathode ray tube (CRT)) connected to the computer system through a graphics port and graphics chipset, an alphanumeric input device 612 (e.g., a keyboard), a cursor control device 614 (e.g., a mouse), and a signal generation device 620 (e.g., a speaker).

The secondary memory 616 may include a machine-readable storage medium (or more specifically a computer-readable storage medium) 624 on which is stored one or more sets of instructions (e.g., the test controller 626) embodying any one or more of the methodologies or functions described herein. The test controller 626 may also reside, completely or at least partially, within the main memory 604 and/or within the rules processing device 602 during execution thereof by the computer system 600, the main memory 604 and the rules processing device 602 also constituting machine-readable storage media. The test controller 626 may further be transmitted or received over a network 618 via the network interface device 622.

The computer-readable storage medium 624 may also be used to store the test controller 626 persistently. While the computer-readable storage medium 624 is shown in an exemplary embodiment to be a single medium, the term "computer-readable storage medium" should be taken to include a single medium or multiple media (e.g., a centralized or distributed database, anchor associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The test controller modules 628, components and other features described herein (for example in relation to FIG. 1) can be implemented as discrete hardware components or integrated in the functionality of hardware components such as ASICS, FPGAs, DSPs or similar devices. In addition, the test controller modules 628 can be implemented as firmware or functional circuitry within hardware devices. Further, the test controller modules 628 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "validating," "reporting," "outputting," "translating," "computing," or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, Flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer-readable storage medium includes any mechanism for storing information in a form readable by a computer. For example, a computer-readable storage medium includes read only memory ("ROM"), random access memory ("RAM"), magnetic disk storage media; optical storage media, flash memory devices or other type of machine-accessible storage media.

Thus, a method and apparatus for test results validation been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

We claim:

1. A method comprising:
   receiving, by a processing device, a test grammar specific to a domain of a device under test;
   receiving, by the processing device, a plurality of test rules specific to a type of the device under test, wherein the plurality of test rules are declarative statements defined using the test grammar for a test to be executed on the device;
   determining, by the processing device, whether each of the plurality of the test rules is supported by the test grammar;
   translating, by the processing device, each of the plurality of test rules into executable code using the test grammar when it is determined that each of the plurality of test rules are supported by the test grammar, wherein the plurality of test rules indicate expected test results of the test executed on the device under test; and
   validating, by the processing device, generated test results of the device under test using the executable code, wherein the validating comprises comparing the generated test results with the expected test results using the test rules specifying number of messages resulting from the expected test results, property of a message from the expected test results and content of the message from the expected test results.

2. The method of claim 1, wherein the domain defines a type of one or more devices supported by the test grammar.

3. The method of claim 1, wherein the test grammar is formatted in an extended markup language.

4. The method of claim 1 further comprising discarding the test rule of the plurality of the test rules when it is determined that the test rule is not supported by the test grammar.

5. The method of claim 1 wherein the translating further comprises parsing each of the plurality of the test rules in view of the test grammar.

6. The method of claim 1 wherein the validating comprising comparing a property of a message from the generated test results with the property of the message from the expected test results specified by the test rules.

7. The method of claim 1 wherein the validating comprising comparing a number of messages from the generated test results with the number of messages from the expected test results specified by the test rules.

8. A non-transitory computer readable storage medium having instructions stored thereon that, when executed by a processing device, cause the processing device to perform operations comprising:
   receiving, by a processing device, a test grammar specific to a domain of a device under test;
   receiving, by the processing device, a plurality of test rules specific to a type of the device under test, wherein the plurality of test rules are declarative statements defined using the test grammar for a test to be executed on the device;
   determining, by the processing device, whether each of the plurality of the test rules is supported by the test grammar;
   translating, by the processing device, each of the plurality of test rules into executable code using the test grammar when it is determined that each of the plurality of test rules are supported by the test grammar, wherein the plurality of test rules indicate expected test results of the test executed on the device under test; and
   validating, by the processing device, generated test results of the device under test using the executable code, wherein the validating comprises comparing the generated test results with the expected test results using the test rules specifying number of messages resulting from the expected test results, property of a message from the expected test results and content of the message from the expected test results.

9. The non-transitory computer readable storage medium of claim 8, wherein the domain defines a type of one or more devices supported by the test grammar.

10. The non-transitory computer readable storage medium of claim 8, wherein the test grammar is formatted in an extended markup language.

11. The non-transitory computer readable storage medium of claim 8, wherein the operations further comprise discarding the test rule of the plurality of test rules when it is determined that the test rule is not supported by the test grammar.

12. The non-transitory computer readable storage medium of claim 8, wherein the translating further comprises parsing each of the plurality of the test rules in view of the test grammar.

13. The non-transitory computer readable storage medium of claim 8 wherein the validating comprising comparing a property of a message from the generated test results with the property of the message from the expected test results specified by the test rules.

14. The non-transitory computer readable storage medium of claim 8 wherein the validating comprising comparing a number of messages from the generated test results with the number of messages from the expected test results specified by the test rules.

15. A system comprising:
   a memory; and
   a processing device coupled to the memory to receive instructions from the memory to:
     receive a test grammar specific to a domain of a device under test;
     receive a plurality of test rules specific to a type of the device under test, wherein the plurality of test rules are declarative statements defined using the test grammar for a test to be executed on the device;
     determine whether each of the plurality of the test rules is supported by the test grammar;
     translate each of the plurality of test rules into executable code using the test grammar when it is determined that each of the plurality of test rules are supported by the test grammar, wherein the plurality of test rules indicate expected test results of the test executed on the device under test; and
     validate generated test results of the device under test using the executable code, wherein the validating comprises compare the generated test results with the expected test results using the test rules specifying number of messages resulting from the expected test results, property of a message from the expected test results and content of the message from the expected test results.

16. The system of claim 15 wherein the domain defines a type of one or more devices supported by the test grammar.

17. The system of claim 15, the processing device to discard the test rule of the plurality of test rules when it is determined that the test rule is not supported by the test grammar.

18. The system of claim 15 wherein the translate further comprises parse each of the plurality of the test rules in view of the test grammar.

19. The system of claim 15 wherein the validate comprises compare a property of a message from the generated test results with the property of the message from the expected test results specified by the test rules.

20. The system of claim 15 wherein the validate comprises compare a number of messages from the generated test results with the number of messages from the expected test results specified by the test rules.

* * * * *